United States Patent [19]
Palazzetti

[11] 3,757,142
[45] Sept. 4, 1973

[54] COMBINED THRESHOLD DETECTOR AND MULTIVIBRATOR CIRCUIT

[75] Inventor: Mario Palazzetti, Avigliana, Turin, Italy

[73] Assignee: Fiat Societa per Azioni, Turin, Italy

[22] Filed: Jan. 11, 1972

[21] Appl. No.: 216,972

[52] U.S. Cl. .............. 307/273, 307/235, 307/247 R
[51] Int. Cl. .............................................. H03k 3/26
[58] Field of Search ................ 307/273, 235, 247 R; 328/207

[56] References Cited

UNITED STATES PATENTS

| | | | |
|---|---|---|---|
| 3,614,473 | 10/1971 | Lindsey et al. | 307/273 |
| 2,837,663 | 6/1958 | Walz | 307/273 |
| 3,253,133 | 5/1966 | Rabinovici et al. | 307/273 X |
| 3,573,506 | 4/1971 | Morris | 307/273 |

*Primary Examiner*—Stanley D. Miller, Jr.
*Attorney*—Richard C. Sughrue, John H. Mion et al.

[57] ABSTRACT

A circuit which acts simultaneously as a threshold circuit and a monostable multivibrator is disclosed. The circuit, in its preferred form comprises three transistors two of which form the multivibrator and the third of which performs a control switching operation to determine the threshold function. The circuit operates from a single voltage source. When in operation one of the transistors of the multivibrator part of the circuit is biased to saturated conducting state and the other is biased to a non-conducting state, the threshold transistor is biased to a saturated conducting state and connected to the non-conducting transistor such that when a signal is applied to its base its conducting or non-conducting state determines the switching of the multivibrator.

6 Claims, 2 Drawing Figures

COMBINED THRESHOLD DETECTOR AND MULTIVIBRATOR CIRCUIT

BACKGROUND OF THE INVENTION

The present invention relates to an electronic circuit having simultaneously the characteristics of a threshold circuit and a monostable multivibrator.

Circuits which combine the operation of a threshold circuit capable of providing a sudden change in the value of an output voltage in response to the passage of an input signal above or below a threshold value, and of a monostable multivibrator are known. Such operations can be obtained in combination by means of the association of two or more circuits which independently provide the behavior of a threshold circuit and a monostable multivibrator respectively. However, practical examples of such circuits available until now were considerably complex since they required a relatively large number of active devices such as transistors and also required the use of a number of feeding voltages of different values and/or polarities.

There are many applications, particularly on meter vehicles in which circuits of this type are useful, for example an electronic speedometer can be driven by such a circuit. However, for such uses it is necessary to make circuits which are as inexpensive as possible and at the same time are very reliable, even when there are large thermal variations in the surrounding in which the circuits operate.

SUMMARY OF THE INVENTION

According to the present invention there is provided an electronic circuit including a monostable multivibrator having a transistor which, in operation of the circuit, is biased to a non-conducting state, and a second transistor which, in operation of the circuit, is biased to a saturated conducting state, characterised in that the base of the first transistor is capacitively coupled to the collector of a third transistor which, in operation of the circuit, is biased to a saturated conducting state in such a way that it is rendered non-conducting by a negative input signal to its base, which base is also coupled by a resistor to the collector, of the first transistor.

It will be appreciated that embodiments of this invention operate as a combined monostable and threshold circuit and require only a single biasing voltage. Moreover, it will be realised that embodiments of this invention can be constructed using fewer components, both active and passive, than have previously been required for circuits of this type, so that economical manufacture is possible.

In a preferred embodiment of the invention there is provided a low pass filter connected to the collector of the second transistor. Such embodiments have a substantially constant response up to relatively high frequencies of input signal.

Various features and advantages of the invention will become more apparent during the following description, given purely by way of non-restrictive example.

DESCRIPTION OF THE PREFERRED EMBODIMENT

Figure 1:
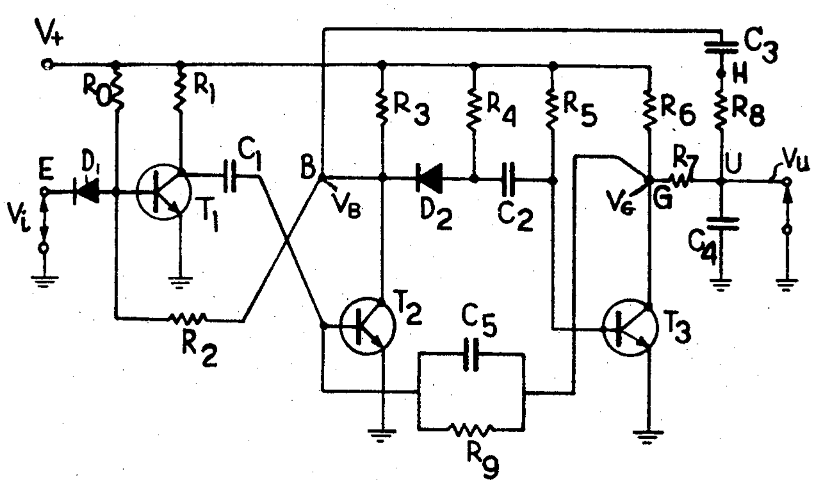
FIG. 1 is a circuit diagram of the embodiment to be described.

In FIG. 1, an input amplifier is formed by an NPN transistor $T_1$, having a grounded emitter and whose collector is connected to a source +V of biasing voltage via a biasing resistor $R_1$.

A junction diode $D_1$ for compensating the thermal drift of the emitter-base junction of the transistor $T_1$ is connected to the base of the transistor $T_1$ and to a terminal E to which an input signal $V_i$ is applied.

The transistor $T_1$ is normally biased to a saturated conducting state by virtue of the connection of its base, by means of the potential applied via a resistor $R_o$ which is connected between the base and the source of biasing voltage +V. The collector of the transistor $T_1$ is connected through a condenser $C_1$, to the base of a transistor $T_2$ which is normally biased to a non-conducting state. The transistor $T_2$, together with a normally saturated transistor $T_3$, forms a monostable multivibrator. The collector of the transistor $T_3$ is connected to a circuit junction G which is coupled to the transistor $T_2$ by a parallel connected resistor $R_9$ and a condenser $C_5$, as is usual in a monostable multivibrator.

The collector of the transistor $T_2$ is connected to the source of biasing voltage +V through a biasing resistor $R_3$. The collector of the transistor $T_3$ goes to the source of biasing voltage +V through a biasing resistor $R_6$. The base of the transistor $T_3$ is connected to the source of biasing voltage +V through a biasing resistor $R_5$, so that the transistor $T_3$ is normally biased to a saturated conducting state. The collector of the transistor $T_3$ is thus, practically, at ground potential; this potential is also applied to the base of the transistor $T_2$ to maintain this transistor non-conducting. The collector of the transistor $T_2$ is thus held at the biasing voltage and maintains the transistor $T_1$ saturated through the resistor $R_2$. The diode $D_2$ has the double function of compensating for the thermal drift of the transistor $T_2$ and also preventing the condenser $C_2$ from recharging through the resistor $R_3$ thereby uncoupling the collector of the transistor $T_2$ from the condenser $C_2$.

The collector of the transistor $T_3$ is connected via the circuit junction G to a low-pass filter formed by a resistor $R_7$ and by a grounded condenser $C_4$. In order to raise the upper cut off frequency of the response of the circuit, the circuit junction U between the resistor $R_7$ and the condenser $C_4$ is connected to the circuit junction B through a condenser $C_3$ and a resistor $R_8$ in series. The junction U is thus effectively coupled to the collector of the transistor $T_2$. The operation of this coupling will be described below.

OPERATION

The circuit described above operates as follows. When a varying signal $V_i$ is applied to the terminal E, of a negative value sufficient to overcome the biasing of the base of the transistor $T_1$, which biasing normally maintains this transistor in a saturated conducting state, the transistor $T_1$ switches off. Its collector voltage increases, and this variation is transmitted through the condenser $C_1$ to the base of the transistor $T_2$, thereby switching it to a conductive state. The voltage of the circuit junction B and therefore of the collector of the transistor $T_2$ then decreases to a low value, substantially that of ground potential. This voltage variation is transmitted through the resistor $R_2$ to the base of the transistor $T_1$ assisting in switching it off. The voltage variation is also transmitted through the diode $D_2$ to the condenser $C_2$ which immediately transfers the change in potential to the base of the transistor $T_3$ thereby switching it to a non-conductive state, whereafter the condenser $C_2$ begins to recharge.

If the signal $V_i$ at the input N continues to hold the transistor $T_1$ in a non-conductive state, the circuit comprising the transistors $T_2$ and $T_3$ continues to operate as a monostable multivibrator, so that the condenser $C_2$ is recharged, until the base of $T_3$ is raised to a potential sufficient return to the transistor $T_3$ to a conductive state thereby switching off the transistor $T_2$. If, instead, the voltage of the base of the transistor $T_1$ becomes such as to allow the transistor $T_1$ to conduct again, the negative impulse which as a consequence is applied by the condenser $C_1$ to the base of the transistor $T_2$ is such as to switch this transistor once again to a non-conductive state. The diode $D_2$ then uncouples the collector of the transistor $T_2$ from the condenser $C_2$, allowing the transistor $T_2$ to assume the new state without being influenced by the condenser $C_2$. The circuit comprising the transistors $T_2$ and $T_3$ is then forced to return to the original state and the circuit as a whole acts as a threshold or trigger circuit.

Figures 2A, 2B, 2C:
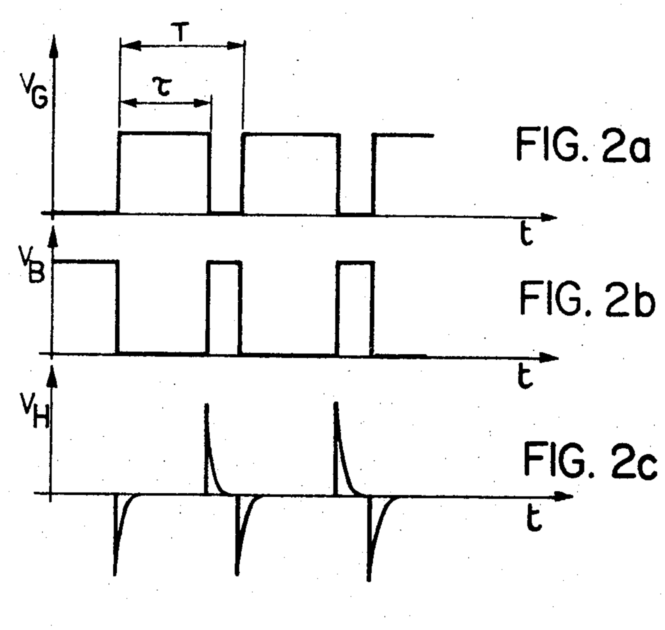
FIG. 2 is a diagram showing the voltage wave forms at various points in the circuit which will be used by the operation of the electronic circuit of FIG. 1.

An output signal from the electronic circuit described above can be taken from the collector of the transistor $T_3$, which is shown in FIG. 2(*a*) as $V_G$. The wave form $V_G$ is effectively formed by successive impulses of constant duration $\tau$, the interval between corresponding edges of successive impulses being T.

The train of impulses $V_G$ could alternatively be integrated to obtain a continuous voltage signal $V_U$ proportional to the frequency 1/T of the train of impulses $V_G$. In this case the arrangement comprising the resistors $R_7$ and $R_8$ and the condensers $C_3$ and $C_4$ becomes operative. In fact, as will be seen from the diagram FIGS. 2*b* and 2*c* which represent the voltage $V_B$ at the circuit junction B and its derivative $V_H$, the impulses of the signal $V_H$ which modify the signal $V_G$ at the point U due to the resistor $R_8$, and the capacitor $C_3$, cause a reduction of the absorption of the response at the highest frequencies, thereby improving the high frequency response of the circuit.

The high frequency response is also improved by the presence of the resistor $R_2$, which allows a more rapid switching of the transistor $T_1$. Naturally the circuit described is also able to function when positive impulses are applied to the input E of the circuit.

The particular circuit arrangement described allows a single supply voltage to be used for the whole circuit instead of the different source voltages and polarities needed by previously known circuits.

One use for this invention, for which it is particularly suited, is for the control of tachometers or electronic speedometers of motor vehicles on the basis of signals provided, for example, by the rotation of a shaft. However the field of possible applications includes numerous other possibilities.

We claim:

1. An electronic circuit comprising a. multivibrator means including
   a first transistor,
   means biasing said first transistor to a non-conducting state,
   a second transistor,
   means biasing said second transistor to a saturated conducting state, and
   means interconnecting said first and second transistors, b. threshold circuit means including
   a third transistor,
   means biasing said third transistor to a saturated conducting state, wherein a negative input signal to the base of the third transistor switches the third transistor to a non-conducting state; and
   a signal input terminal, said base of said third transistor being coupled to said signal input terminal c. capacitive means coupling the base of said first transistor to the collector of said third transistor, d. resistive means coupling the base of said third transistor to the collector of said first transistor, and e. circuit means coupling the collector of said first transistor to the base of said second transistor said circuit means including a first diode and a condenser connected in series wherein said first diode provides temperature compensation for said first transistor.

2. The electronic circuit of claim 1, further including temperature compensation means including a second diode coupled to said signal input terminal, said temperature compensation means compensating for thermal drift of said third transistor.

3. The electronic circuit of claim 1 wherein the collector of said first transistor, the collector and base of said second transistor, and the collector of said third transistor, are all coupled by respective resistors to said biasing voltage source.

4. The electronic circuit of claim 1 wherein the collector of said second transistor is connected to the input of a low pass filter.

5. The electronic circuit of claim 4 wherein said low pass filter comprises a series resistor and a grounded condenser.

6. The electronic circuit of claim 5 wherein the junction between said series resistor and said grounded condenser of said low pass filter is coupled to the collector of said first transistor by a condenser and a resistor in series.

* * * * *

UNITED STATES PATENT OFFICE

CERTIFICATE OF CORRECTION

Patent No. 3,757,142 Dated September 4, 1973

Inventor(s) Mario Palazzetti

It is certified that error appears in the above-identified patent and that said Letters Patent are hereby corrected as shown below:

In The Heading:

The claim to priority was omitted. Should read:

January 22, 1971 Italy........................No. 67222-A/71

Signed and sealed this 2nd day of April 1974.

(SEAL)
Attest:

EDWARD M.FLETCHER,JR.
Attesting Officer

C. MARSHALL DANN
Commissioner of Patents